Dec. 30, 1969   C. H. W. POLZIN   3,486,207
METHOD OF MANUFACTURING A SPEED REDUCER
Original Filed Feb. 12, 1965   4 Sheets-Sheet 1

INVENTOR
CLAYTON H.W. POLZIN

BY Thomas W. Ehrmann

ATTORNEY

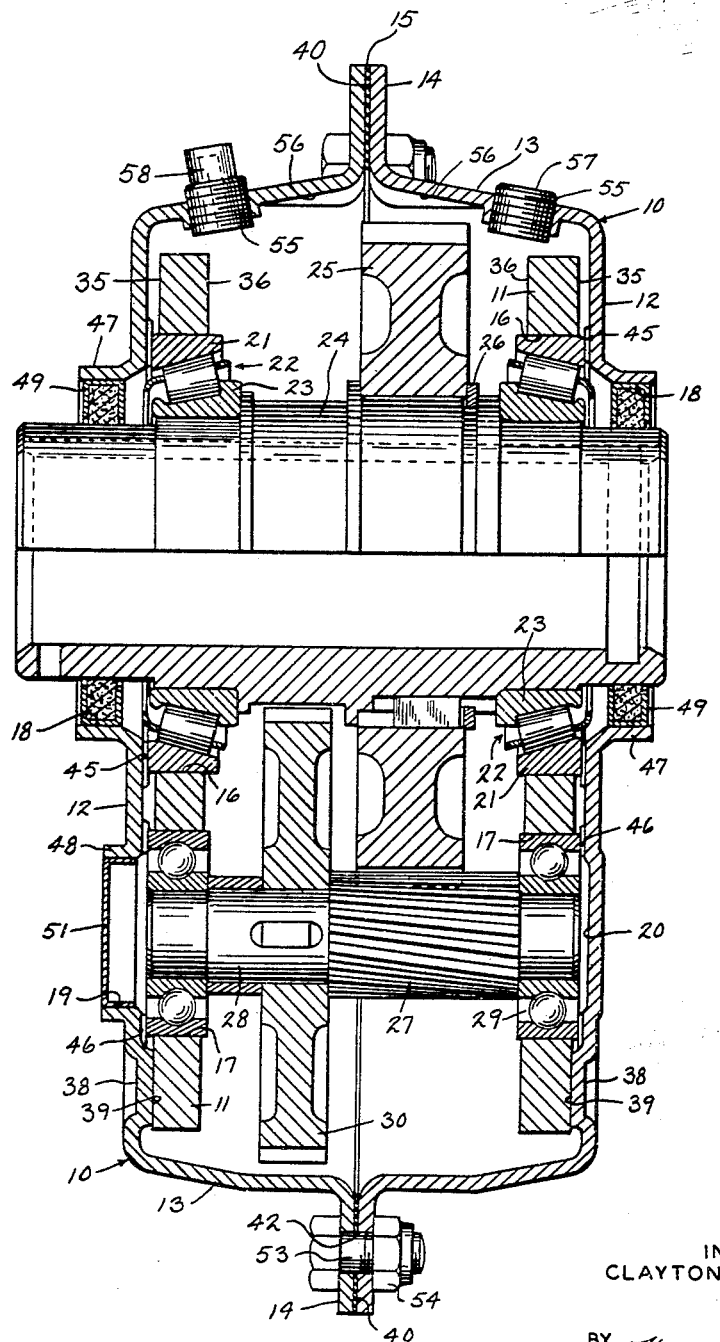

Dec. 30, 1969   C. H. W. POLZIN   3,486,207
METHOD OF MANUFACTURING A SPEED REDUCER
Original Filed Feb. 12, 1965   4 Sheets-Sheet 3

INVENTOR
CLAYTON H.W. POLZIN

BY
Thomas W. Ehrmann

ATTORNEY

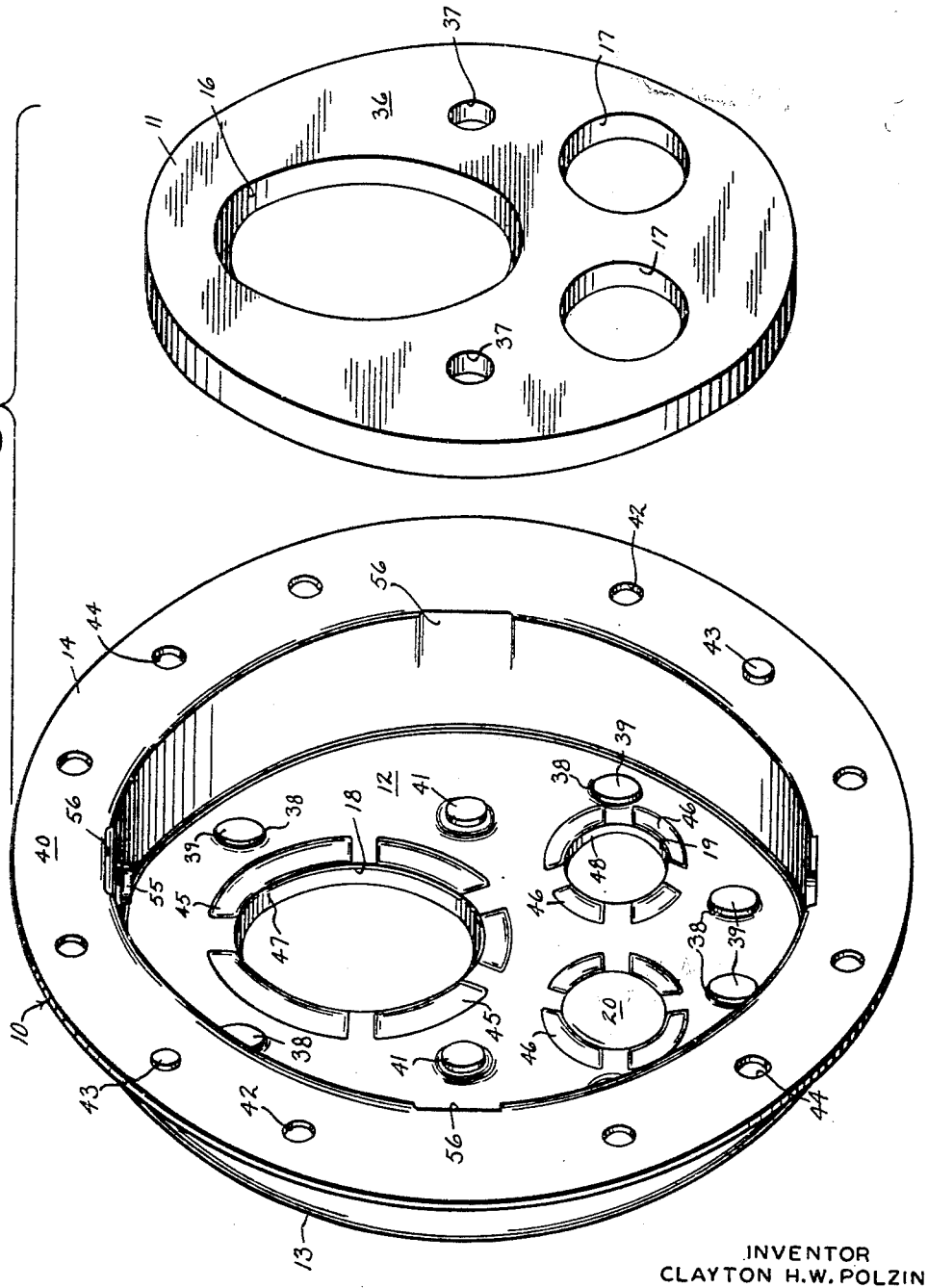

United States Patent Office 3,486,207
Patented Dec. 30, 1969

3,486,207
METHOD OF MANUFACTURING A SPEED REDUCER
Clayton H. W. Polzin, Milwaukee, Wis., assignor, by mesne assignments, to The Falk Corporation, Milwaukee, Wis., a corporation of Delaware
Original application Feb. 12, 1965, Ser. No. 432,317, now Patent No. 3,348,430, dated Oct. 24, 1967. Divided and this application June 29, 1967, Ser. No. 655,710
Int. Cl. B23q *17/00;* B21d *39/02*
U.S. Cl. 29—407    4 Claims

ABSTRACT OF THE DISCLOSURE

An enclosure and bearing support for a speed reducer is made from two identical housing halves each comprised of a flat, generally circular bearing plate and a dish-shaped thin walled cover. Each bearing plate is independently prepared with shaft bearing openings and a pair of locating holes. Each cover is independently formed with an end wall, a radial flange and a sleeve portion joining the end wall and flange. A plurality of buttons are formed in the end wall to project inwardly of the cover. Shaft openings and inwardly projecting dowels are also formed in the end wall with the same center-to-center spacing as the shaft bearing openings and locating holes of a bearing plate. A bearing plate is then joined with and secured to a cover with the dowels of the cover received in the locating holes of the bearing plate and with the bearing plate being axially located against the buttons. Next, alternately spaced locating holes and dowels are formed in the flange of each housing half so that with bearings installed in the shaft bearing openings and gearing in place, the two halves can be joined together with the flange locating holes of each half receiving the flange dowels of the other half.

---

This is a division of application Ser. No. 432,317, filed Feb. 12, 1965, now Patent No. 3,348,430.

This invention relates to speed reducers, and more particularly to an improved speed reducer having housing halves that include a bearing plate which mounts bearings receiving shafts of meshing reduction gearing and a cover to which the bearing plate is secured and that encloses the reduction gearing, together with means insuring the proper axial and radial location of the bearing plate in the cover and proper alignment of the housing halves relative to each other. The invention further resides in a method of manufacturing such speed reducer housing halves.

It is a principal object of this invention to provide an improved compact speed reducer that is more economical to manufacture and assemble than speed reducers heretofore known.

It is another object of this invention to provide such a speed reducer capable of accommodating the meshing reduction gearing of different multiples of speed reduction.

A further object of this invention is to provide a new and improved speed reducer housing half that includes a bearing plate that supports the reduction gearing and a cover to which the bearing plate is secured and which encloses the reduction gearing, together with registering means on the cover and bearing plate that properly locate the bearing plate in the cover for alignment of bearing openings in the bearing plate with shaft openings in the cover.

Still another object of this invention is to provide such a housing half that includes a mounting flange on the cover with registerable means that mate with similar means of a second housing half for proper alignment of the bearing openings of the housing halves.

It is also an object of this invention to provide a method of manufacturing such housing halves that insures proper alignment of the bearing plate and cover, and proper alignment of a pair of assembled housing halves.

It is still a further object of this invention to provide a speed reducer incorporating a pair of identical housing halves to permit the reduction of inventory requirements and simplify assembly of the speed reducer.

It is another object of this invention to provide a speed reducer in which the housing is formed of low cost metal plates and sheet metal parts that are formed without the need for costly machining operations.

The foregoing and other objects of this invention will appear in the description which follows. In the description reference will be made to the accompanying drawings which form a part hereof and in which there is shown a particular embodiment of the invention. The embodiment illustrated will be described in sufficient detail to enable those skilled in the art to comprehend the invention; however, it will be obvious that modifications can be made to the structure, methods, and operations described without departing from the scope of the invention. Consequently, the description should not be taken in a limiting sense.

In the drawings:

FIG. 2 is a view in vertical section taken in the plane of the lines 2—2 of FIG. 1;

FIG. 4 is an exploded view in perspective of a bearing plate and cover which comprise one of the identical housing halves of the speed reducer of FIG. 1.

Figure 1:
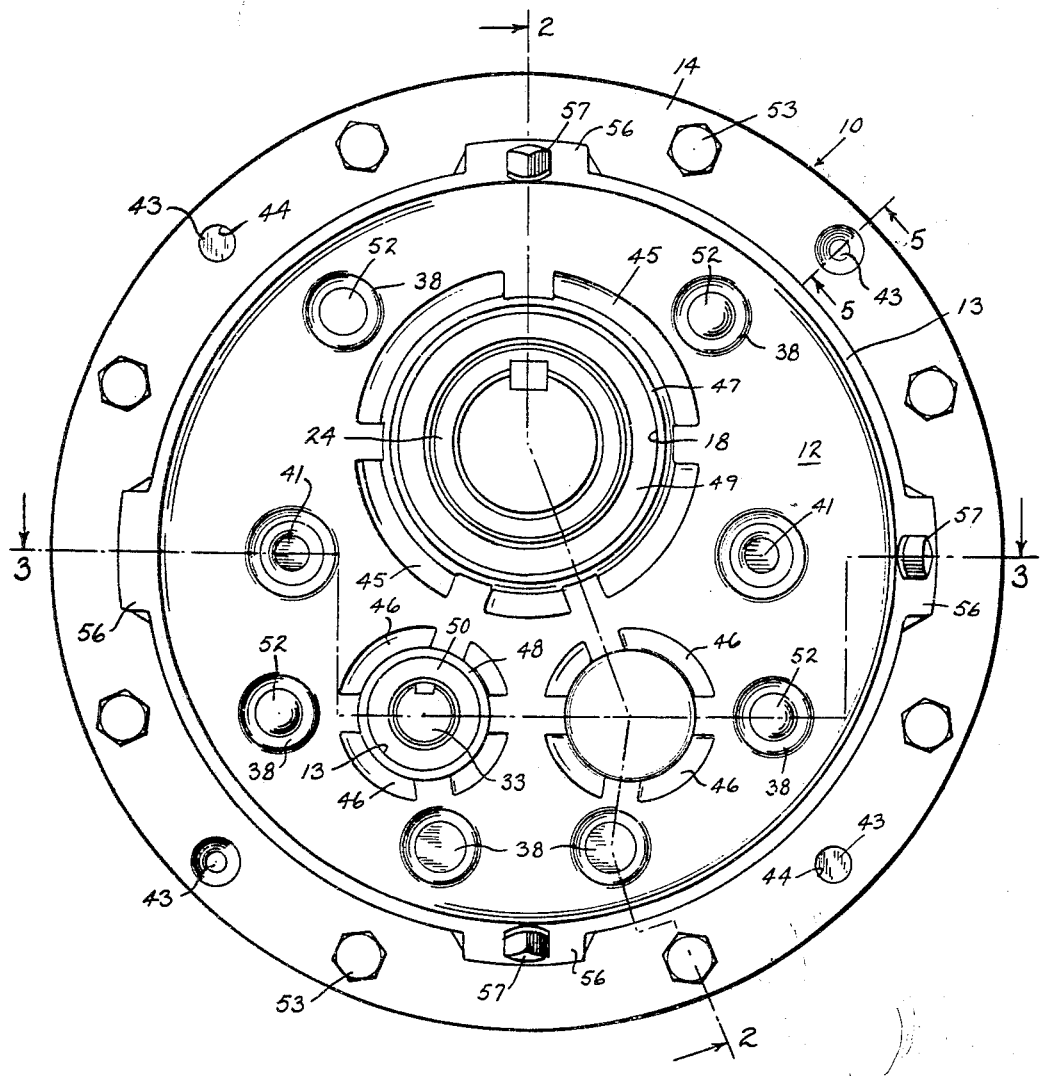
FIG. 1 is a front view in elevation of a speed reducer in accordance with this invention.
Figure 5:
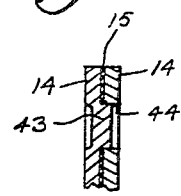
FIG. 5 is a view in section taken in the plane of the lines 5—5 of FIG. 1.

Referring now to the drawings, the embodiment of the speed reducer illustrated in the drawings will first be described generally. A housing for the speed reducer is formed of two identical housing halves each of which includes a dish-shaped cover 10 and a bearing plate 11 secured to the interior of the cover 10. The covers 10 are each formed with an end wall 12, a sleeve portion 13 extending axially from the end wall, and a radial flange 14 extending outwardly from the sleeve portion 13. The flanges 14 of the two covers 10 are joined together with a gasket 15 therebetween to form an enclosure for the meshing gearing that accomplishes the speed reduction.

The bearing plates 11 are generally circular in outline and of substantial thickness compared with the thin wall of the covers 10. Each bearing plate 11 is provided with an output shaft bearing opening 16 and a pair of intermediate shaft bearing openings 17. The intermediate shaft bearing openings are preferably equally spaced from the output shaft bearing opening 16 with the centers of the intermediate shaft bearing openings 17 and output shaft bearing opening 16 lying at the corners of an isosceles triangle. The altitude of the isosceles triangle so defined lies on a diameter of the bearing plate 11 which passes through the center of the output shaft bearing opening 16.

Each of the covers 10 has its end wall 12 provided with an output shaft opening 18, an input opening 19, and an intermediate shaft location 20. The center-to-center spacings between the output shaft opening 18, the input shaft opening 19, and the intermediate shaft location 20 coincide with the spacings between the bearing openings 16 and 17 of the bearing plate 11 so that when the bearing plate 11 is properly located on the end wall 12 the output shaft opening 18 will be coaxial with the output shaft bearing opening 16 and the input shaft opening 19 and intermediate shaft location 20 will be coaxial with the intermediate shaft bearing openings 17.

The outer races 21 of a pair of tapered roller bearings 22 are received within the output shaft bearing openings 16 in the bearing plates 11. The inner races 23 of the tapered roller bearings 22 are mounted about the ends of a quill output shaft 24 and are axially located by shoulders provided on such output shaft 24. A bull gear 25 is keyed to the shaft 24 and located axially thereon between a shoulder formed on the quill shaft 24 and a snap ring 26. As seen in FIG. 2, the bull gear 25 meshes with an intermediate pinion 27 formed on an intermediate shaft 28 that is journaled at its ends in ball bearings 29 received within one of the coaxial sets of intermediate shaft bearing openings 17 in the bearing plates 11. An intermediate gear 30 is keyed to the intermediate shaft 28 and is axially located and restrained thereon between the shoulder formed by the intermediate pinion 27 and a spacer 31.

Figure 3:
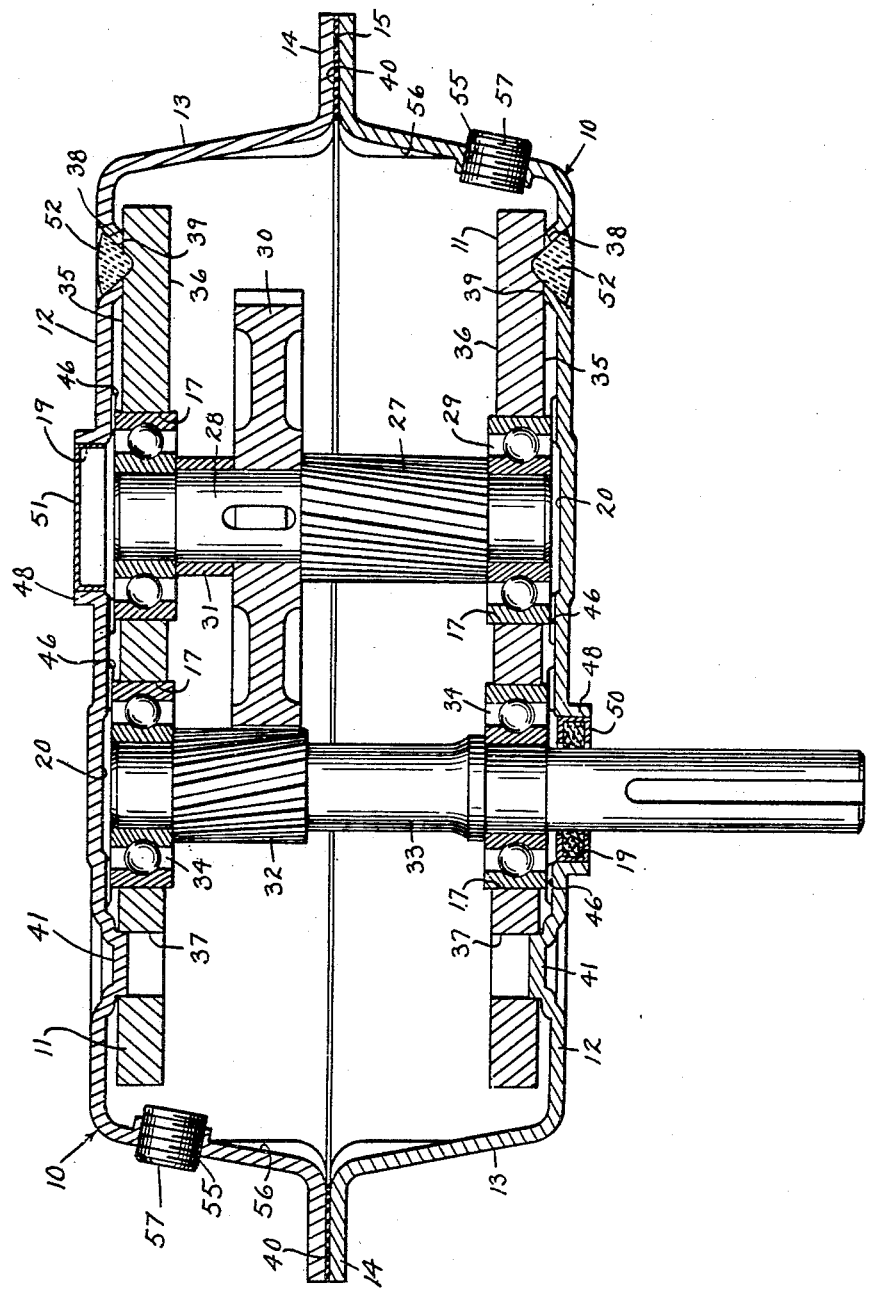
FIG. 3 is a view in horizontal section taken in the plane of the lines 3—3 of FIG. 1.

Referring to FIG. 3, the intermediate gear 30 meshes with an input pinion 32 formed on an input shaft 33 journaled in ball bearings 34 received in the remaining set of coaxial intermediate shaft bearing openings 17 in the bearing plates 11. One end of the input shaft 33 projects through a respective one of the input shaft openings 19 in the cover 10.

It will be apparent that the speed reducer which has thus far been described will accomplish a two stage speed reduction of motive power applied by a prime mover to the projecting portion of the input shaft 33, and that the output shaft 24 is adapted to receive the drive shaft of driven equipment for shaft mounting of the speed reducer. It will also be apparent that the bearing plates 11 must be properly located in their respective covers 10 to align the bearing openings of the bearing plates 11 with the shaft openings of the covers 10 and to axially position the bearing plates 11 relative to the end walls 12 so that the bearings will not bind when the speed reducer is assembled. To this end, axial locating means are provided in the end walls 12 to insure a proper axial position of the bearing plates 11 in the covers 10 and registering locating means are povided in the end walls 12 and bearing plates 11 to insure proper alignment of the bearing plates 11 in a radial plane. Additionally, registerable locating means are provided in the flanges 14 to insure that the assembly of the housing halves will result in alignment of the bearing openings of the two bearing plates 11.

Specifically, each of the bearing plates 11 is provided with planar inner and outer side surfaces 35 and 36, respectively. In addition to the shaft bearing openings 16 and 17, a pair of locating holes 37 are also formed in the bearing plates 11. The locating holes 37 are each disposed to a side of the altitude of the isosceles triangle defined by the bearing openings 16 and 17, and the pair of locating holes 37 lie on a diameter of the bearing plate 11 that is normal to such altitude. Thus, the locating holes 37 are arranged symmetrically in relation to the bearing openings 16 and 17.

The end wall 12 of each cover 10 is formed with a plurality of spaced, integral button portions 38 that extend inwardly of the normal inner surface of the end wall 11 and terminate in axial locating surfaces 39 (see FIG. 2). The locating surfaces 39 of each of the six illustrated button portions 38 lie in a common plane spaced inwardly of the cover 10 from the end wall 12 and that is parallel to a mounting surface 40 of the flange 14 of the cover 10. A pair of spaced, integral dowels 41 are also formed in each end wall 12 of the covers 10. The dowels 41 project inwardly of the normal inner surface of each end wall 12 a distance greater than the projection of the button portions 38. The center-to-center spacing of the the dowels 41 relative to the output shaft opening 18, input shaft opening 19, and intermediate shaft location 20 of each cover 10 is the same as the center-to-center spacings of the locating holes 37 relative to the bearing openings 16 and 17.

The flange 14 of each cover is provided with a plurality of equally spaced bolt holes 42. Each flange 14 is also provided with a pair of dowels 43 projecting from the mounting surface 40 and a pair of locating holes 44. The dowels 43 and locating holes 44 are alternately arranged and equally spaced about the flange 14. The arrangement of the dowels 43 and locating holes 44 is such that they are disposed symmetrically about a diameter of the end wall 12 that passes through the centers of the dowels 41 of the covers 10.

The end wall 12 of each cover 10 is provided with a plurality of annular portions 45 that surround the output shaft opening 18 and are spaced apart to present an interrupted appearance. These annular portions 45 extend inwardly of the cover 10 beyond the normal interior surface of the end wall 11, and the inner surface of each of the annular portions 45 lies in a common plane. Similar annular portions 46 are also provided about the input shaft opening 19 and the intermediate shaft location 20 of each end wall 12. As will be seen in FIGS. 2 and 3, the annular portions 45 and 46 axially position the shaft bearings received in the bearing openings 16 and 17 of each bearing plate 11.

The output shaft opening 18 and the input shaft opening 19 are provided with outwardly projecting lips 47 and 48, respectively, that receive oil seals that work against the projecting output and input shafts 24 and 33, respectively. That is, oil seals 49 are disposed within the lips 47 of the output shaft openings 18 and work against the outer periphery of the output shaft 24. An additional oil seal 50 is disposed within the lip 48 to work against the projecting ends of the input shaft 33.

It will be apparent that the input shaft opening 19 of one of the covers 10 is not required when the input shaft 33 does not project through both covers 10. The otherwise open and unused input shaft opening 19 is closed by a cap 51 press fitted in the lip 48 surrounding such input shaft opening 19.

The covers 10 and bearing plates 11 are adapted for simple assembly to form the housing halves, and the speed reduced is likewise readily assembled from the housing halves with the assurance that all critical openings and surfaces will be properly aligned to accept the reduction gearing. The housing halves are assembled from the previously independently prepared covers 10 and bearing plates 11 by installing a bearing plate 11 in a cover 10 with the dowels 41 of the cover 10 received in the mating locating holes 37 of the bearing plate 11 and with the planar inner surface 35 of the bearing plate 11 seated against the locating surfaces 39 of the button portions 38. While installed in such position, the bearing plate 11 is secured to the cover 10 by suitable means which in the preferred embodiment consist of button welds 52 applied externally of the cover 10 at the location of certain of the button portions 38 (see FIGS. 1 and 3).

The locating surfaces 39 axially locate the bearing plate 11 relative to the end wall 12 and the mounting surface 40 of the flange 14. The registering dowels 41 of the end wall 12 and locating holes 37 of the bearing plate 11 accurately locate the bearing plate 11 in a radial plane relative to the cover 10 to align the bearing openings 16 and 17 with the output shaft opening 18, the input shaft opening 19, and the intermediate shaft location 20. For greatest accuracy, the dowels 43 and locating holes 44 of the flanges 14 are formed after the bearing plate 11 has been installed and secured to the cover 10, so as to positively locate the dowels 43 and locating holes 44 relative to the bearing openings 16 and 17.

To assemble the speed reducer from the housing halves requires simply an insertion of the outer races 21 of the tapered bearings 22 in the output shaft bearing openings 16 of the bearing plates 11 and against the annular portions 45. The shafts with their pinions, gears and bearings may be preassembled and inserted in the respective bearing openings 16 and 17 as the housing halves are brought together. The housing halves are properly registered by the mating dowels 43 and locating holes 44 of the flanges 14 with the dowels 43 of each flange being received in the locating holes 44 of the other flange. Bolts 53 and nuts 54 removably secure the housing halves together with the mounting surfaces 40 of the flanges 14 opposing each other and separated by the gasket 15. Finally, the oil seals 49 and 50 may be inserted in the output and input shaft openings 18 and 19, respectively.

Since the bearing openings 16 and 17 of each bearing plate 11 have been accurately located with respect to the dowels 43 and locating holes 44 of the flange 14 of its respective cover by the manufacture of the housing half, upon being joined together the bearing openings of each housing half will be aligned so that the shafts will turn freely in their respective bearings. Furthermore, the annular portions 45 axially locate the tapered roller bearings 22 and the annular portions 46 define the limits of end play for the ball bearings 29 and 34.

When assembled, the covers 10 with the gasket 15, the oil seals 49 and 50 and the cap 51 form a fully enclosed lubricant housing. Lubricant may be admitted to the interior of the housing through a plurality of plug openings 55 disposed in lubricant pockets 56 formed in each quadrant of the sleeve portion 13 of a cover 10. The plug openings 55 are formed in three of the four pockets 56 and all but one are closed by pipe plugs 57 that are removable for filling the assembled speed reducer with lubricant. The remaining plug opening 55 is closed by an air vent plug 58. The interrupted annular portions 45 and 46 of each cover 10 hold the antifriction bearings away from the normal interior surface of the end wall 12 and the passages formed between the annular portions 45 and 46 permit the circulation of the lubricant behind each of the antifriction bearings.

The form of the housing half lends itself ideally to low cost manufacturing processes practically devoid of any machining operations and carried out primarily by press operations. Specifically, it has been found that highly desirable results are obtained by forming the housing halves in substantially the following manner. The bearing plate 15 is independently prepared from a slightly oversize thickness of hot rolled steel that is pierced to simultaneously form the shaft bearing openings 16 and 17 and the locating holes 37, and in the same operation is blanked to form the generally circular shape of the bearing plate 11. The side surfaces 35 and 36 are finished as by grinding and the bearing openings 16 and 17 and locating holes 37 are simultaneously finished by rough and finish shaving operations.

The cover 10 is independently formed of relatively thin flat rolled steel which is first blanked and then drawn to form the rough dish shape including the end walls 12, sleeve portion 13, and flange 14. This is followed by a second drawing operation which forms the four pockets 56, the annular portions 45 and 46, and the button portions 38. Next, the oil plug openings 55 are extruded and then the locating surfaces 39 of the button portions 38 and the mounting surface 40 of the flange 14 are sized. The bolt holes 42, the dowels 41, and the output shaft opening 18 and input shaft opening 19 are pierced at the next stage of operation, although the output and input shaft openings 18 and 19 are pierced undersize. In the next step the output and input shaft openings 18 and 19 are extruded to form the lips 47 and 48, respectively, and the button portions 38 and flange 14 are coined. Finally, the plug openings 55 are tapped.

After a bearing plate 11 has been joined with a cover 10, the dowels 43 of the flange 14 are extruded and the locating holes 44 of the flange 14 are pierced with the positions being controlled from the bearing openings 16 and 17 of the bearing plate 11.

The invention has been described in relation to a shaft mounted, double reduction speed reducer. However, by omitting the intermediate shaft 28 and meshing the input shaft directly to the output shaft a single speed reduction can be obtained. Similarly, by providing an additional series of bearing openings in the bearing plates 11 equally spaced from the output shaft bearing opening 16 triple, quadruple, and greater multiples of speed reduction can be obtained. When used as a shaft mounted speed reducer, the quill shaft 24 is mounted on the input shaft of the equipment to be driven in a known manner and a torque reaction arm would extend from the speed reducer housing to earth. Thus, the loads of the reduction gearing would be borne by the bearing plates 11 and the torque reaction by the covers 10.

It will be appreciated from the above description that a bearing mounting and enclosure has been provided that is economical to form and assemble, that is lighter in weight than cast iron housings which have been extensively used for speed reducers. The economy of manufacture is accomplished without sacrificing accuracy of alignment and location because of the novel construction of the housing halves. Assembly of the speed reducer can be accomplished by relatively unskilled workmen and does not require special equipment.

I claim:

1. The method of manufacturing a speed reducer housing half comprising: preparing a bearing plate having planar side surfaces, an output shaft bearing opening, an input shaft bearing opening, and a pair of locating holes; independently preparing a dish-shaped cover including an end wall, a plurality of button portions in the end wall that project inwardly of the cover and terminate in axial locating surfaces that lie in a common plane, an output shaft opening, an input shaft opening, and a pair of dowels projecting inwardly of the end wall with the center-to-center spacings of the shaft openings relative to said dowels being the same as the center-to-center spacing of the bearing openings relative to said locating holes; then installing said bearing plate in said cover with said dowels received in said locating holes and said bearing plate seated against said locating surfaces; and securing said bearing plate to said cover while installed in such position.

2. The method of manufacturing a speed reducer housing half comprising: preparing a bearing plate with an output shaft bearing opening, an input shaft bearing opening, a pair of locating holes, and planar side surfaces; independently shaping a sheet to form a dish-shaped cover including an end wall; forming a plurality of button portions in the end wall that project inwardly of the cover and terminate in axial locating surfaces that lie in a common plane; forming an output shaft opening, an input shaft opening, and a pair of locating dowels in the end wall of the cover while controlling the center-to-center spacings of the shaft openings and dowels to be identical to such spacings between the bearing openings and holes of the bearing plate; then installing the bearing plate in the cover with the dowels of the cover received in the locating holes of the bearing plate and with the bearing plate resting against the locating surfaces of the button portions; and securing the bearing plate to the cover while so installed.

3. The method of manufacturing a speed reducer housing half comprising: shaping a relatively heavy section sheet to form a generally circular bearing plate; forming an output shaft bearing opening, a pair of intermediate shaft bearing openings, and a pair of locating holes in the bearing plate while controlling the center-to-center spacings between the bearing openings and locating holes; forming planar side surfaces on said bearing plate; independently shaping a thin section sheet to form a dish-shaped cover having an end wall, a sleeve portion extending from the end wall, and a radial flange extending outwardly of the sleeve portion; forming a plurality of integral button portions in the end wall of the cover that project inwardly of the cover and terminate in axial locating surfaces that lie in a common plane; forming an output shaft opening, an input shaft opening, and a pair of integral locating dowels in the end wall of the cover while controlling the center-to-center spacings between said shaft openings and said dowels to be identical to respective spacings between the bearing openings and locating holes of the bearing plate; then installing the bearing plate in the cover with the dowels of the cover received in the locating holes of the bearing plate and with a planar side surface of the bearing plate resting against the locating surfaces of the button portions; and securing the bearing plate to the cover.

4. The method of manufacturing a bearing mounting and enclosure comprising: forming a relatively heavy section, flat bearing plate having a shaft bearing opening and a pair of locating holes while controlling the center-to-center spacings of the bearing opening relative to the locating holes; independently shaping a relatively thin section sheet to form a dish-shaped cover including an end wall and a mounting flange spaced from the end wall; forming a plurality of button portions in the end wall that project inwardly of the cover and terminate in axial locating surfaces that lie in a common plane while controlling the axial spacing of said locating surfaces from said mounting flange; forming a pair of locating dowels in the end wall of the cover that project inwardly of the cover; then installing the bearing plate in the cover with the dowels of the cover received in the locating holes of the bearing plate and with the bearing plate resting against the locating surfaces of the button portions; securing the bearing plate to said cover; and forming registerable locating means on said flange while controlling the radial relation of said locating means relative to said bearing opening.

References Cited

UNITED STATES PATENTS

| | | | |
|---|---|---|---|
| 2,237,958 | 4/1941 | Hansen et al. | 74—606 |
| 2,306,233 | 12/1942 | Smith | 74—606 |
| 2,906,137 | 9/1959 | Bade | 74—606 X |
| 3,048,051 | 8/1962 | Pickles | 74—606 X |
| 3,096,113 | 7/1963 | Polzin | |
| 3,137,921 | 6/1964 | Hillberg | 29—463 X |
| 3,150,533 | 9/1964 | Wallgren | 74—606 |

CHARLIE T. MOON, Primary Examiner

U.S. Cl. X.R.

29—463, 464